United States Patent
Pearse et al.

(10) Patent No.: US 7,315,848 B2
(45) Date of Patent: Jan. 1, 2008

(54) WEB SNIPPETS CAPTURE, STORAGE AND RETRIEVAL SYSTEM AND METHOD

(76) Inventors: Aaron Pearse, 4/2 Hallam Street, Bendigo, VIC 3550 (AU); John Douglass, 35 Greenwood Drive, Bendigo, VIC 3550 (AU); John Moetteli, Case Postale 486, rue de Contamines 29, CH-1211 Geneva 12 (CH)

( * ) Notice: Subject to any disclaimer, the term of this patent is extended or adjusted under 35 U.S.C. 154(b) by 434 days.

(21) Appl. No.: 10/450,213

(22) PCT Filed: Dec. 12, 2001

(86) PCT No.: PCT/US01/48150

§ 371 (c)(1),
(2), (4) Date: Jun. 11, 2003

(87) PCT Pub. No.: WO02/059774

PCT Pub. Date: Aug. 1, 2002

(65) Prior Publication Data

US 2004/0019611 A1    Jan. 29, 2004

(51) Int. Cl.
*G06F 17/30*    (2006.01)
(52) U.S. Cl. .................. 707/1; 715/744; 715/748
(58) Field of Classification Search ............ 707/104.1, 707/1; 709/219; 715/501.1, 744, 748, 769
See application file for complete search history.

(56) References Cited

U.S. PATENT DOCUMENTS

| | | |
|---|---|---|
| 5,524,193 A | 6/1996 | Covington et al. |
| 5,553,281 A | 9/1996 | Brown et al. |
| 5,600,775 A | 2/1997 | King et al. |
| 5,655,117 A | 8/1997 | Goldberg et al. |
| 5,713,021 A | 1/1998 | Kondo et al. |
| 5,727,141 A | 3/1998 | Hoddie et al. |
| 5,737,619 A | 4/1998 | Judson |

(Continued)

OTHER PUBLICATIONS

Johnson et al., Automatic touring in a hypertext system, Proceedings of the International Phoenix Conference on Computers and Communications, Tempe, Mar. 23, 1993, New York, IEEE, US, vol. CONF. 12, p. 524-30.

(Continued)

*Primary Examiner*—Don Wong
*Assistant Examiner*—Hanh Thai
(74) *Attorney, Agent, or Firm*—Moetteli & Associés SàRL

(57) ABSTRACT

A web snippets capture, storage, and retrieval system is comprised of a snippet capture and storage method operating on a computer. The system has snippet selection means which selects a snippet, snippet processing means which processes the snippet so selected, and snippet storage means which stores the processed snippet in memory in a format which can be displayed upon demand by a user. Preferably, snippet organization means saves the snippet in association with a category, further in association with a project or theme. A user prompting means prompts the user for a comment, which if provided by the user, the storage means stores in displayable form in association with the snippet. Identifying means store identifying characteristics of the snippet. Such identifying characteristics includes, for example, date and time of creation, size of snippet in relation to source document, source location of snippet, URL of the snippet and optionally the user who added the snippet.

19 Claims, 19 Drawing Sheets

U.S. PATENT DOCUMENTS

| | | | |
|---|---|---|---|
| 5,809,250 A | 9/1998 | Kisor | |
| 5,848,424 A * | 12/1998 | Scheinkman et al. | 715/501.1 |
| 5,852,435 A | 12/1998 | Vigneaux | |
| 5,864,863 A | 1/1999 | Burrows | |
| 5,890,170 A * | 3/1999 | Sidana | 715/501.1 |
| 5,924,090 A | 7/1999 | Krellenstein | |
| 5,933,822 A | 8/1999 | Braden-Harder et al. | |
| 6,035,330 A | 3/2000 | Astiz et al. | |
| 6,067,565 A | 5/2000 | Horvitz | |
| 6,076,104 A | 6/2000 | McCue | |
| 6,121,970 A | 9/2000 | Guedalia | |
| 6,122,647 A | 9/2000 | Horowitz et al. | |
| 6,144,375 A | 11/2000 | Jain et al. | |
| 6,167,409 A | 12/2000 | DeRose et al. | |
| 6,219,679 B1 | 4/2001 | Brisebois | |
| 6,260,044 B1 * | 7/2001 | Nagral et al. | 707/102 |
| 6,266,684 B1 | 7/2001 | Kraus et al. | |
| 6,314,423 B1 | 11/2001 | Himmel et al. | |
| 6,317,757 B1 | 11/2001 | Sakamaki | |
| 6,374,260 B1 * | 4/2002 | Hoffert et al. | 707/104.1 |
| 6,769,019 B2 * | 7/2004 | Ferguson | 709/219 |
| 6,826,553 B1 * | 11/2004 | DaCosta et al. | 707/1 |
| 6,895,557 B1 * | 5/2005 | Wood et al. | 715/744 |
| 6,961,731 B2 * | 11/2005 | Holbrook | 707/102 |
| 7,035,926 B1 * | 4/2006 | Cohen et al. | 709/225 |
| 7,085,994 B2 * | 8/2006 | Gvily | 715/500.1 |

OTHER PUBLICATIONS

Wexelblat et al., Footprints: History-Rich Tools for Information Foraging, Chi'99 Conference Proceedings Human Factors in Computing Systems, May 15, 1999, p. 270-77.

Keller et al., A bookmarking service for organizing and sharing URLs, Computer Networks and ISDN Systems, vol. 29, No. 8-13, Sep. 1997, p. 1103-14.

Newfield et al., Scratchpad: Mechanisms for Better Navigation in Directed Web Searching, ACM Symposium on User Interface Software and Technology, 1998, p. 1-8.

Tauscher et al., How people revisit web pages: empirical findings and implications for the design of history systems, International Journal of Human-Computer Studies, Academic Press, New York, vol. 47, No. 1, Jul. 1997, p. 97-137.

Graham-Cumming, Hits and miss-es: a year watching the web, Computer Networks and ISDN Systems, vol. 29, No. 8-13, Sep. 1997, p. 1357-65.

Declaration Regarding Apparent Prior Art to be submitted with IDS, marked "A", Oct. 18, 2004.

PC Download World Page, concerning 1X-Net-Browser.htm, marked "B" http://www.pcdownloadworld.com/internet/browser-utilities/1X-Net-Browser.htm, Mar. 26, 2006.

* cited by examiner

WEB SNIPPETS CAPTURE, STORAGE AND RETRIEVAL SYSTEM AND METHOD

BACKGROUND OF THE INVENTION

The invention relates to information gathering systems and methods, in particular to systems and methods for storing information found on Internet web pages.

When searching for information on the net, a researcher often finds a number of pages with relevant information. However these pages are of various relevancy to the search and often only of partial interest to the searcher.

When relevant information is found, the source or the download link or URL of this information is noted for reference and later retrieval. Current methods for noting the source includes manually or using a browsers bookmark system, saving each page to a local storage medium, or copying information to other document editors.

U.S. patent application Ser. No. 6,067,565 to Horyitz describes a system that downloads an entire webpage or selected data types therein, in the background. Such system however does not enable selection, storage or organization of a user selected snippet of an already displayed web page.

While each known system has its advantages, each also has disadvantages. These methods can be time consuming, untidy, lacking a way to keep records about the content, distracting from the main purpose of the information retrieval and inadequate for sharing with more than one person.

Furthermore, where people are involved in a group project, the above approaches do not lend themselves to automatically generating a common shared resource.

What is needed therefore is a method of storing the portions of displayed web pages (i.e., snippets) that are of particular interest to the user. Further, what is need is a system and method of categorizing and organizing these snippets.

SUMMARY OF THE INVENTION

A web snippets capture, storage, and retrieval system is comprised of a snippet capture and storage method operating on a computer. The system has snippet selection means which selects a snippet, snippet processing means which processes the snippet so selected, and snippet storage means which stores the processed snippet in memory in a format which can be displayed upon demand by a user. Preferably, snippet organization means saves the snippet in association with a user-defined category/theme, and optionally, further in association with a project. A user prompting means prompts the user for a comment, which if provided by the user, the storage means stores in displayable form in association with the snippet. Identifying means store identifying characteristics of the snippet. Such identifying characteristics includes, for example, date and time of creation, size of snippet in relation to source document, source location of snippet, URL of the snippet and optionally the user who added the snippet.

The system and method of the invention enable one or more users to (i) collect pertinent information of web pages that have been fully downloaded and displayed as a result of a user request (such user-selected portions of already downloaded and displayed content are herein referred to as "snippets") from web pages and other documents quickly in a textual and/or graphic representation, (ii) organize and annotate the information in representative categories and subsets for future access by multiple users, and (iii) retain a date/time record and means to access original web pages from which the information was originally obtained. An indicator of the approximate percentage of original source documents is also provided, as well as a means to re-organize information between subsets.

While the Snippet system retains the advantages of these existing systems, it does so without their disadvantages.

In addition, multiple users on a computer network can concurrently connect to the same snippets resources, review the current content and add to or re-organize the snippets categories and data.

DETAILED DESCRIPTION OF THE PREFERRED EMBODIMENT(S)

Figure 1:
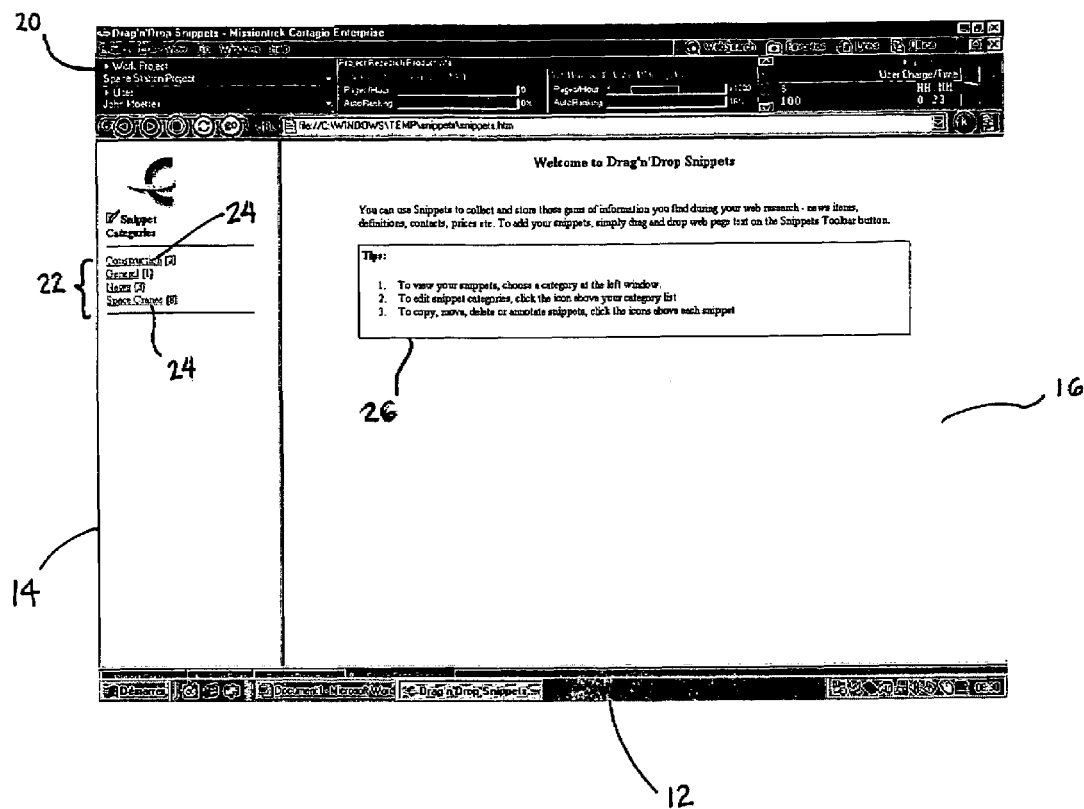
FIGS. 1 to 8 are screen prints of the various interface items of the system and method of the invention.

Referring now to FIG. 1, the graphical user interface 12 of the system and method is shown. The GUI 12 is made up of two frames 14 and 16. The frame 14 is the category frame, located under an indication of the project 20. In this case, "space station project". The category frame 14 displays, in list form, hypertext links 22 to all different snippets categories 24 under the current project 20. The second frame 16 is the display frame in which help instructions 26 are initially provided as a default when a hypertext category link 24 has not been selected by the user.

When referred to herein, "snippets" means an information selection including either graphics, text, or both, and whether or not including identifying characteristics or user annotations that may optionally annotate the snippets.

Figure 2:
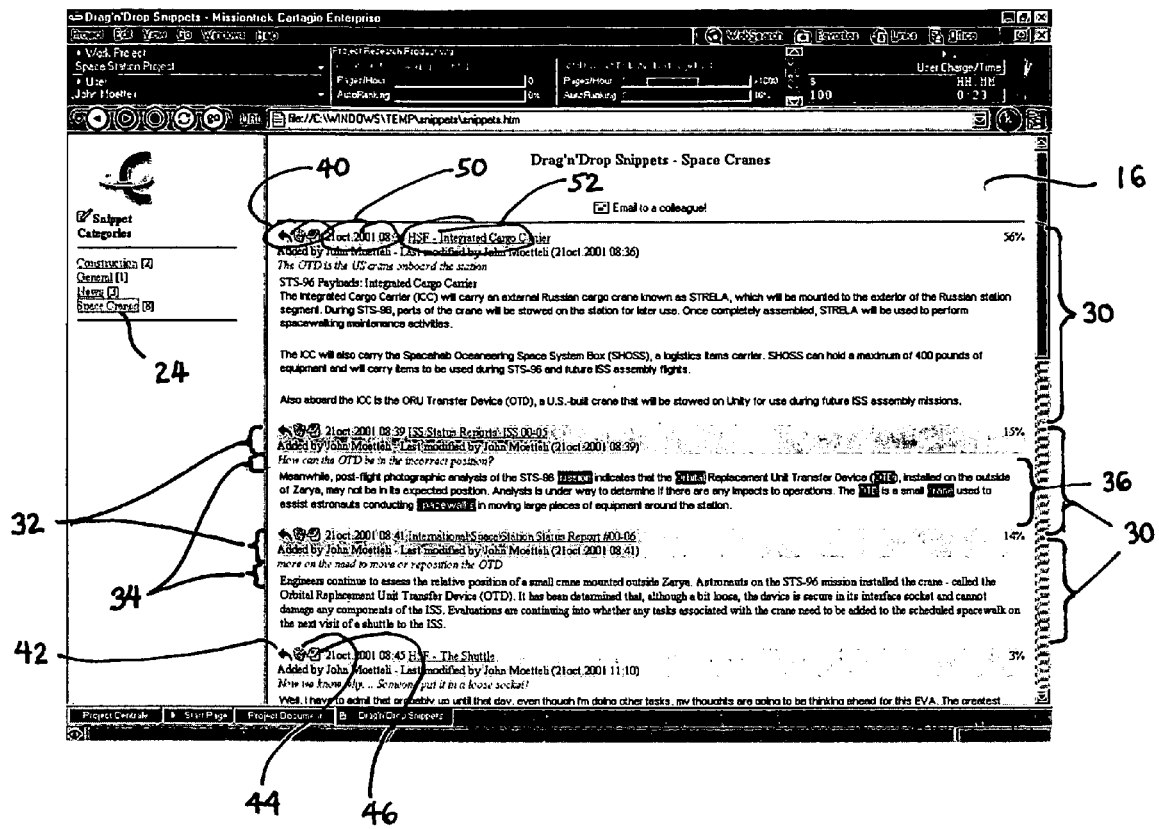

Referring now to FIG. 2, when a hypertext category link 24 is clicked, the snippets 30 associated with that category are displayed in the display field 16. Typically, the term "clicking" means placing a user interface cursor over a visual element the pressing one of the action buttons/keys on the input device controlling the cursor. The display field 16 displays a listing of snippets 30. Each snippet 30 includes a control and validation field 32, a comment field 34 and a snippet field 36. The control and validation field 32 includes manipulation icons 40 (i.e., images, typically with a transparent component) comprised of a move icon 42, a delete icon 44 and a comment icon 46. A date stamp field 50 follows these icons 40. A hypertext link 52 incorporating the URL of the source of the snippets 30 is adjacent the date stamp 50. Further information, including the user who added the snippet and the date last modified and how much of the original source has been copied are provided as well. Below this control and validation field 32 is the comment field 34. Below this comment field 34 is the snippet field 36 itself. Below this first snippet 30 are subsequent snippets, chronologically organized according to the date on which they were created.

Figure 3:
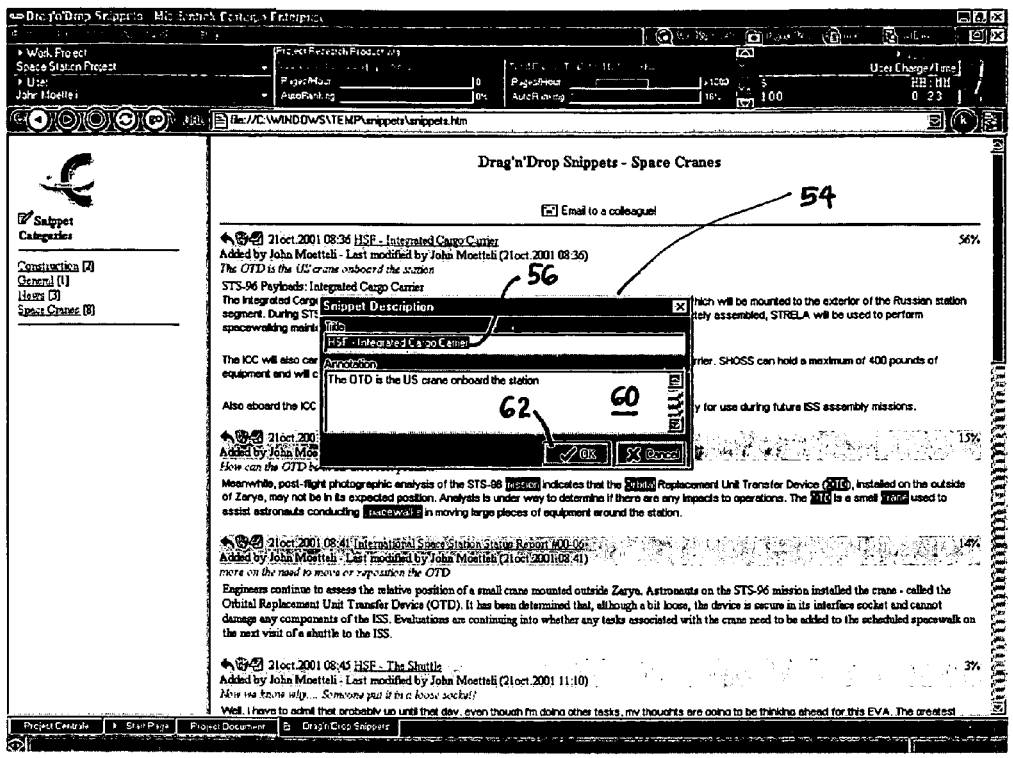

Referring now to FIG. 3, the comment icon 48 has the form of a notepad. When the comment icon 46 is clicked, a comment input field 54 opens, permitting the user to edit the title 56 of the snippet 30 and/or the description 60. This is to allow the user to add information about the snippet that may not be self-evident and to alter the title as not all titles are descriptive of the pages content (though this is largely due to the actions of the pages author or the source of the snippet). Where the snippet content is to be preserved as a legal representation of the source content at the time of capture, the content can optionally be protected against changes by the user. Confirmation of the edited changes can be made by pressing an OK icon 62.

Figure 4:
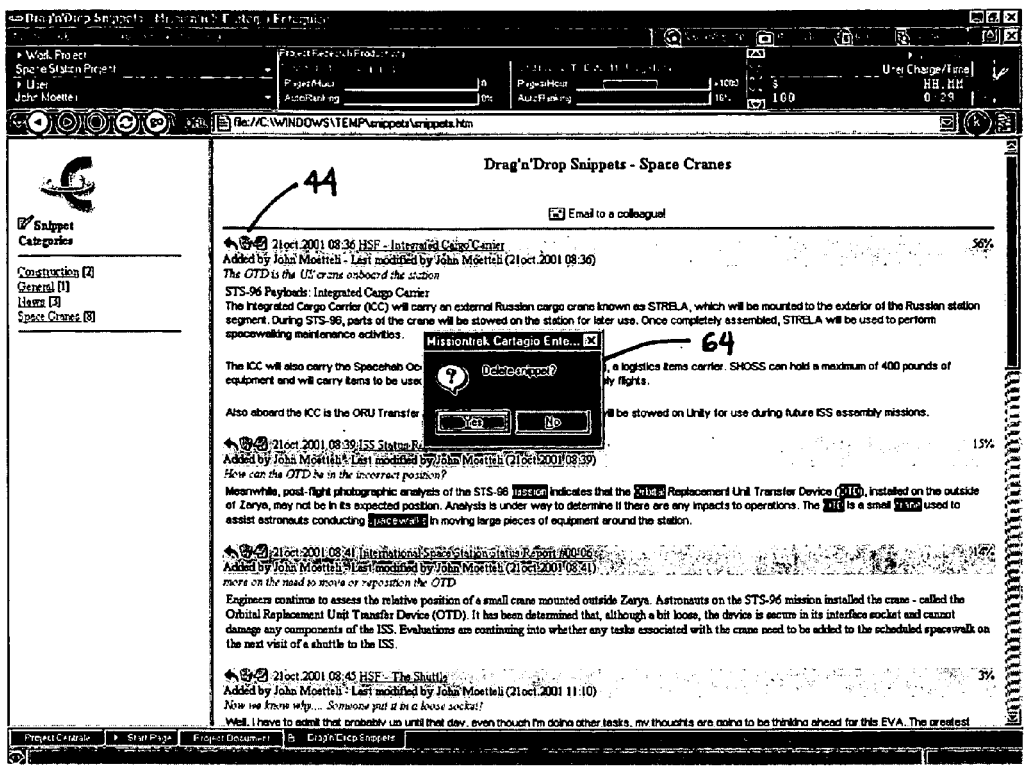

Referring now to FIG. 4, the delete icon 44 has the form of a trashbin. When the delete icon 44 is clicked, a delete confirmation window 64 opens, demanding confirmation of the deletion.

Figure 5:
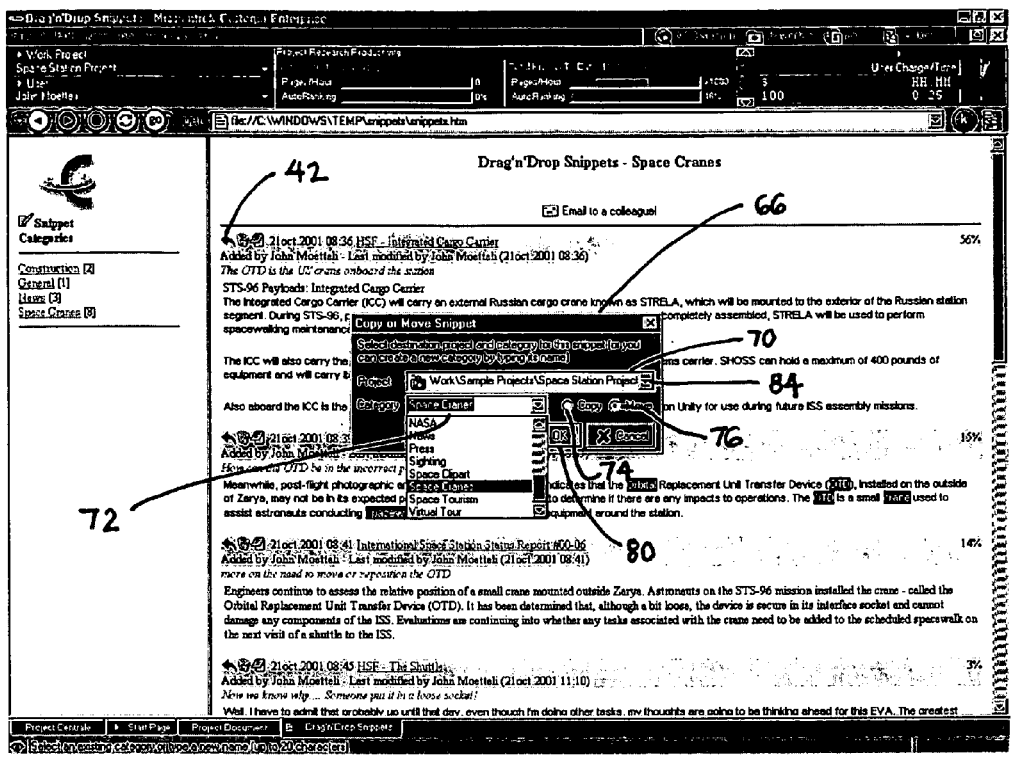

Referring now to FIG. 5, when the move icon 42 is clicked, the copy or move snippet popup window 66 opens. This copy or move window 66 includes a project field 70, a category field 72, copy and move radio buttons 74 and 76, respectively, and a confirmation button 80. Selection of the copy radio button 74 and of another project or category using the scroll features 82 and 84 on this popup window 66 allows the user to copy or move a snippet to any other project under any other category. Upon success, if it was a move operation, the original snippet is deleted from the source category.

Figure 6:
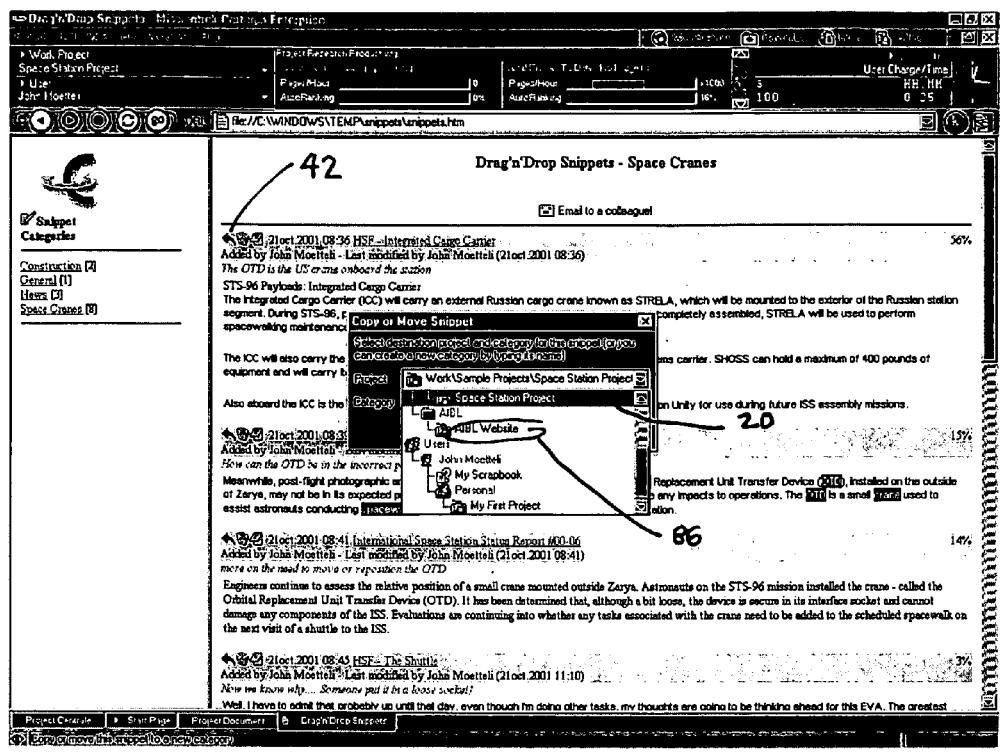

Referring now to FIG. 6, the selection of another project 86 to which to move or copy the snippet 30 is shown. If the same category and project 20 is chosen, a warning popup (not shown) warns the user to "select a different category or type a new category name".

Figure 7:
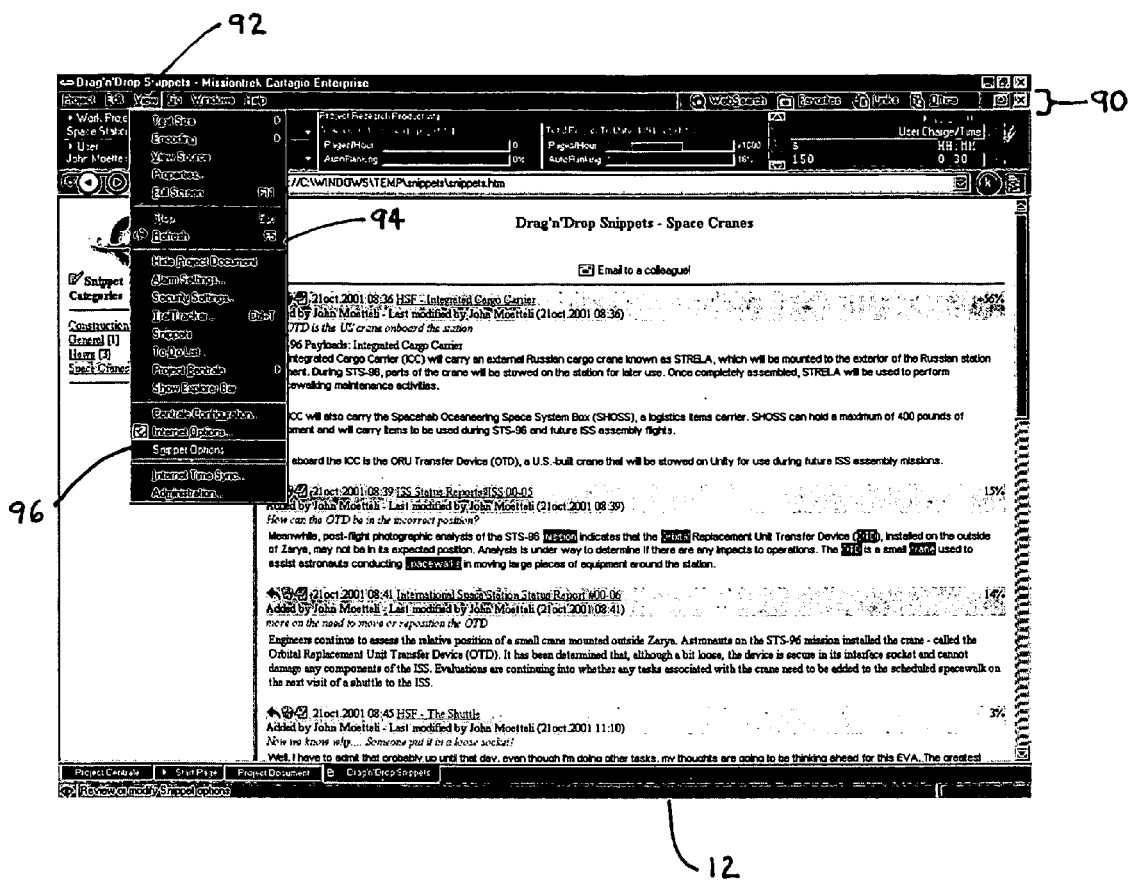

Referring now to FIG. 7, the GUI 12 has an upper menu bar 90 including a view selection 92. If the user clicks on this selection 92, a pull down menu 94 is displayed from which default settings for the system and method can be changed. In this figure, "Snippets options" 96 has been highlighted and selected for this purpose.

Figure 8:
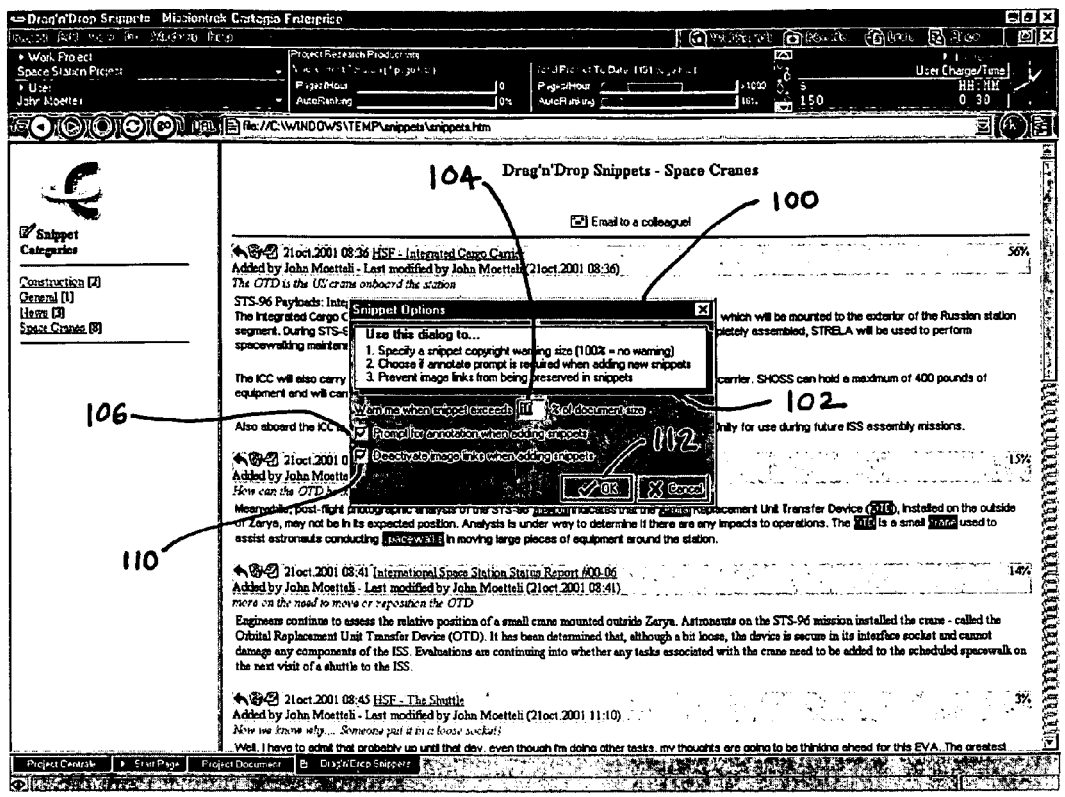

Referring now to FIG. 8, clicking on the snippets option menu item 96 causes the method to display a snippets options popup 100. Basic use instructions 102, a copyright warning level input 104, two tick boxes 106 and 110 to enable prompting for annotation when adding snippets and disactivating image links when adding snippets, and a confirmation button 112 are provided. The copyright warning level input 104 is set at 10% as a default, to indicate a "safe" level of copying based upon the general principal that to support a claim of copyright infringement, there must be substantial copying-insubstantial copying, arguably of 10% or less of the original work, is generally not actionable. If the user resets the warning level to 100%, then it is turned off and no copyright warning 114 (shown in FIG. 13) is displayed. In order to calculate the amount of selection copied for comparison to the copyright warning level, the current amount of the content that is has been highlighted is quantified in comparison to that of the entire page to determine what percentage of the original work is being copied. If this amount is equal to or less than the copyright warning level, no copyright warning 114 (shown in FIG. 13) is shown. If the disactivate image links tick box 110 is unticked, any images in the highlighted, saved selection 116 (shown in FIG. 11) will be downloaded when the snippet 30 is viewed.

In an embodiment of the invention, multiple users on a computer network may concurrently connect to the same snippets resources, review the current content and add to or re-organize the snippets categories and data.

Basic Implementation Steps of the Method

The method of the invention may be set up to use a local or remote directory and may be used by multiple people at the same time. Users begin their information search in whatever manner they choose. Any visited page may contain information of varying relevance to their search.

Figure 9:
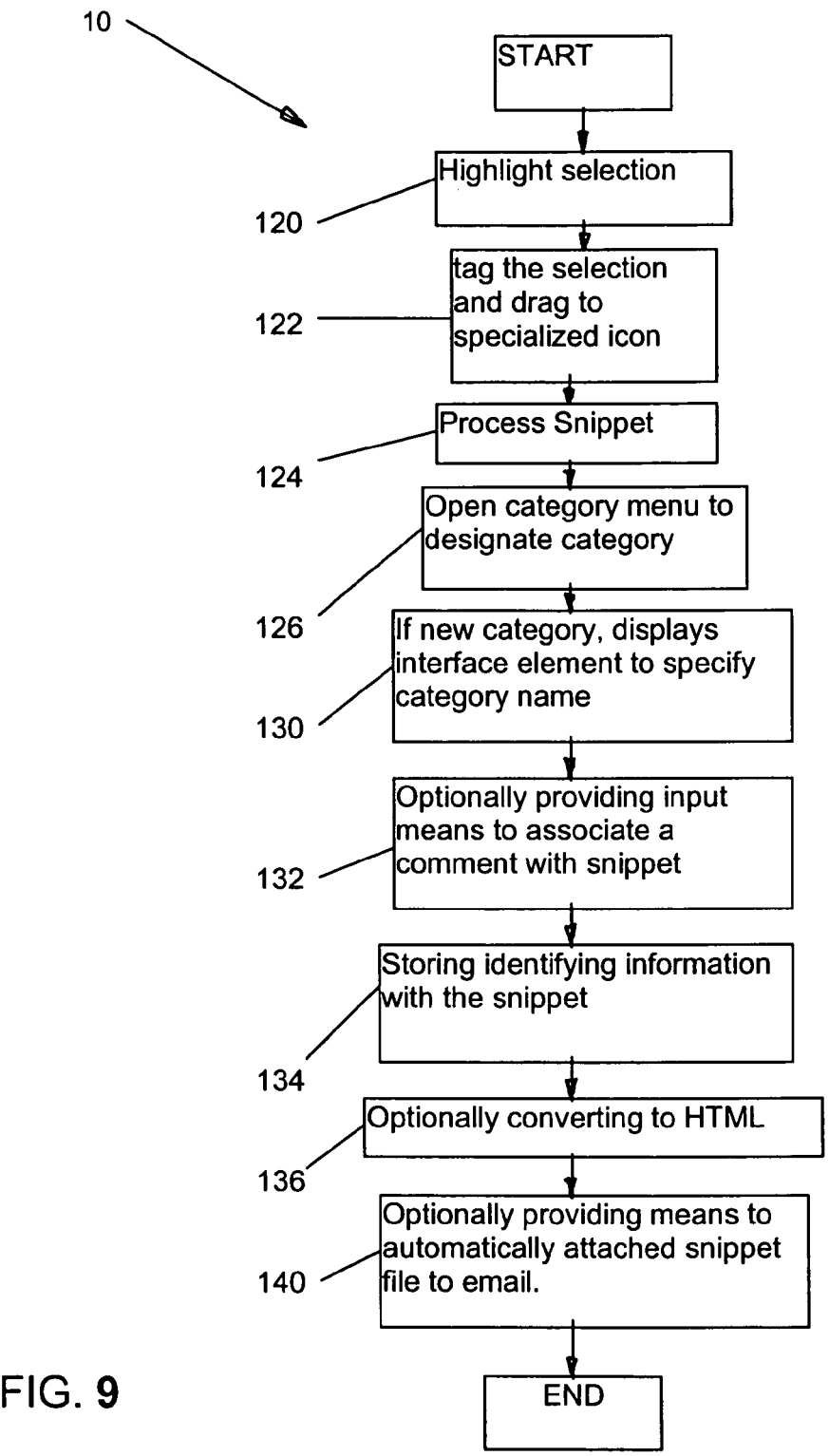
FIG. 9 is a flowchart of the method of the invention.

Referring now to FIG. 9, the method 10 of the invention may be summarized by the following steps. In a first step 120, a selection protocol using standard text and/or graphics selection utilities of a mouse and cursor highlight selection routine enables the user to select a snippet selection. In a second step 122, when a selection is made, the method tags the selection as a snippet and enables the user to drag the snippet to a specialized icon. In a third step 124, when the dragged selection is dragged to the specialized icon, the method 10 recognizes the snippet and processes the snippet as discussed in detail below. In a fourth step 126, the method opens up a category menu allowing the user to select and existing category for the snippet or to create a new category. In a fifth step 130, if the user selects to create a new category, the method displays a user interface element (not shown) to allow the user to enter a name for the new category and verifying that the name is unique before creating the category. In a sixth step 132, after the user selects a category or creates a category for this snippet, the method optionally presents a comment input window into which the user may make comments specifically associated with the snippet. In a seventh step 134, after providing the means to receive and store a comment to be associated with the snippet, the method stores the comment and other routine identifying information such as date of creation, author, etc, in association with the snippet. In an eighth step 136, the method optionally stores the snippet in html format, thus being readable by any browser. In a ninth step 140, the method optionally provides email capabilities whereby the snippet is automatically attached to an email.

Note that the term "dragging" used above describes an action involving the selection of content and the movement of this content by use of an input device (e.g. a mouse) by controlling the operating systems cursor as used by a computer.

Figure 10:
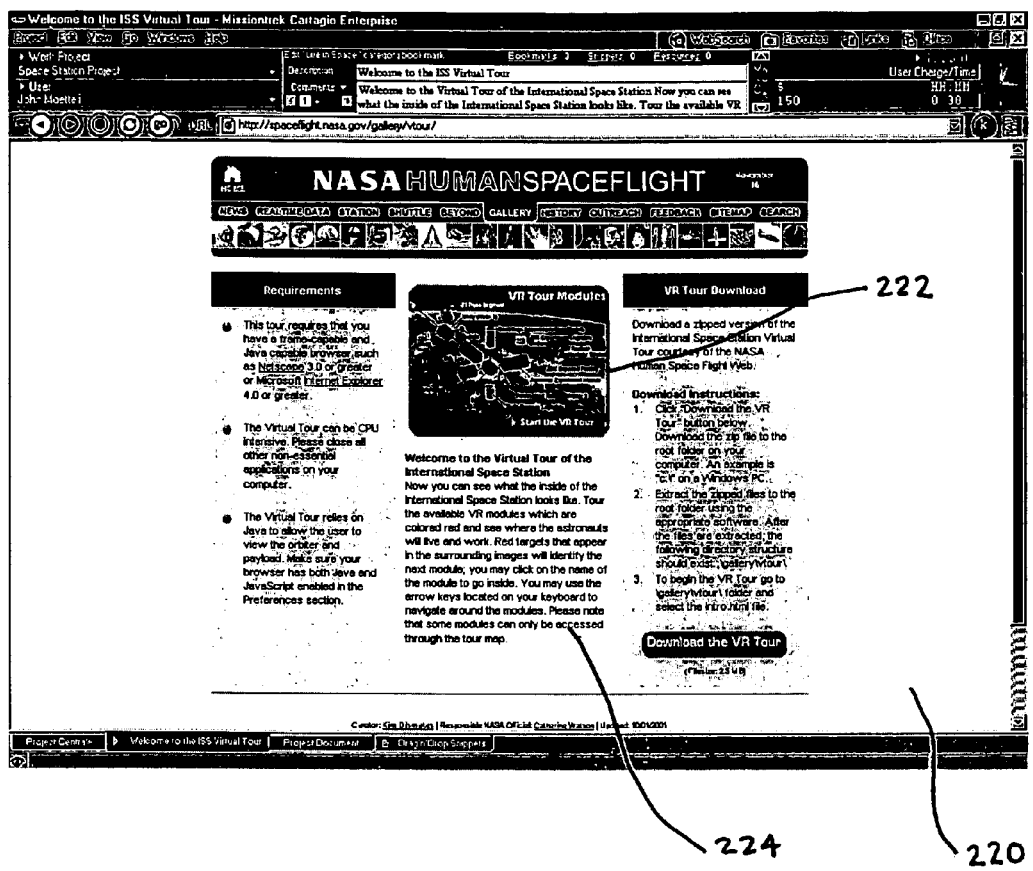
FIGS. 10 to 18 are screen prints showing the operational steps of the method of the invention.

Referring now to FIG. 10, a typical website 220 is shown, including images 222 and text 224.

Figure 11:
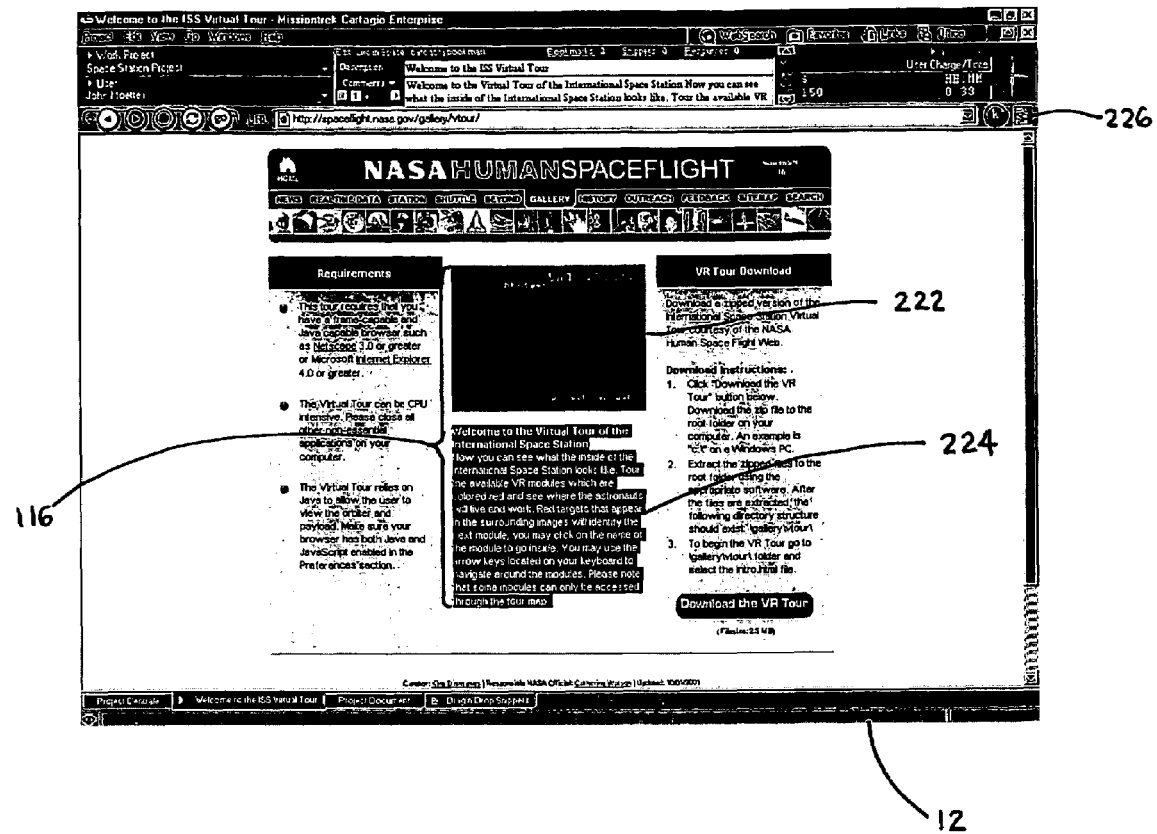

Referring now to FIG. 11, an image 222 and text 224 is highlighted to define a snippet selection 116 using a mouse or click-shift-reposition methods standard in the art. The user than drags this highlighted selection 116 to a snippets receptor icon 226 in the upper right portion of the GUI 12, and drops it into this icon.

Figure 12:
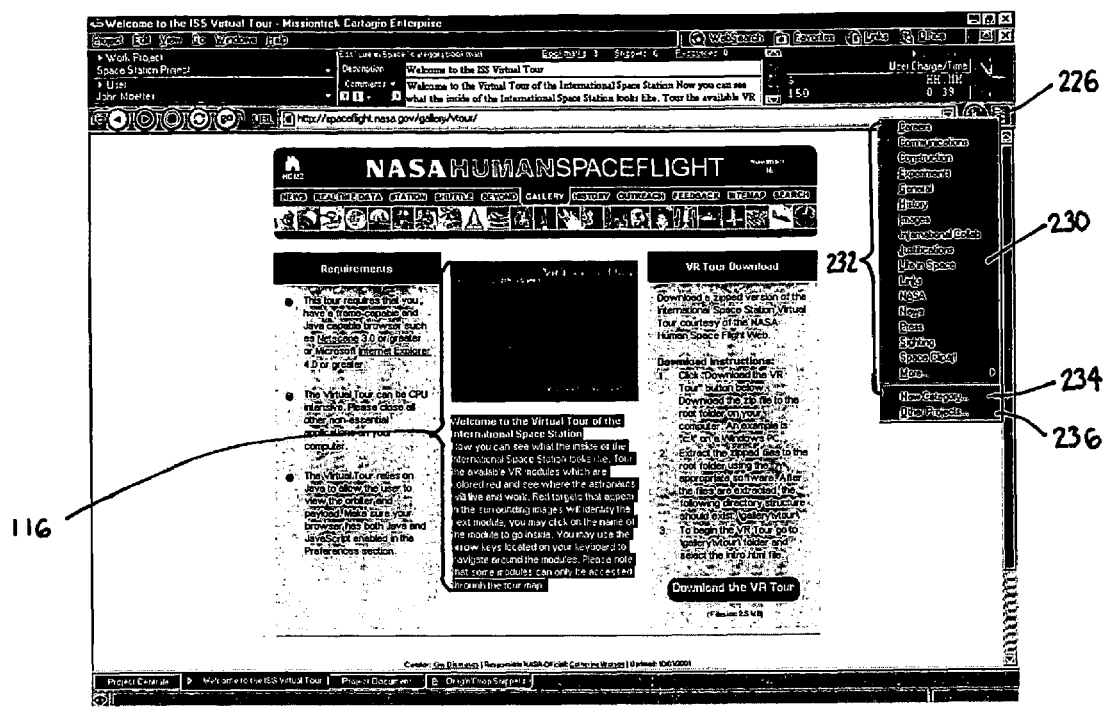

Referring now to FIG. 12, when the highlighted selection 116 is dropped into the icon 226, a drop down listing 230 of all existing categories 232 is presented to the user, along with a "New category" option 234 permitting the user to create a new category, and an "other projects" option 236 which permits the user to select a new project in which to store the snippet 30.

Figure 13:
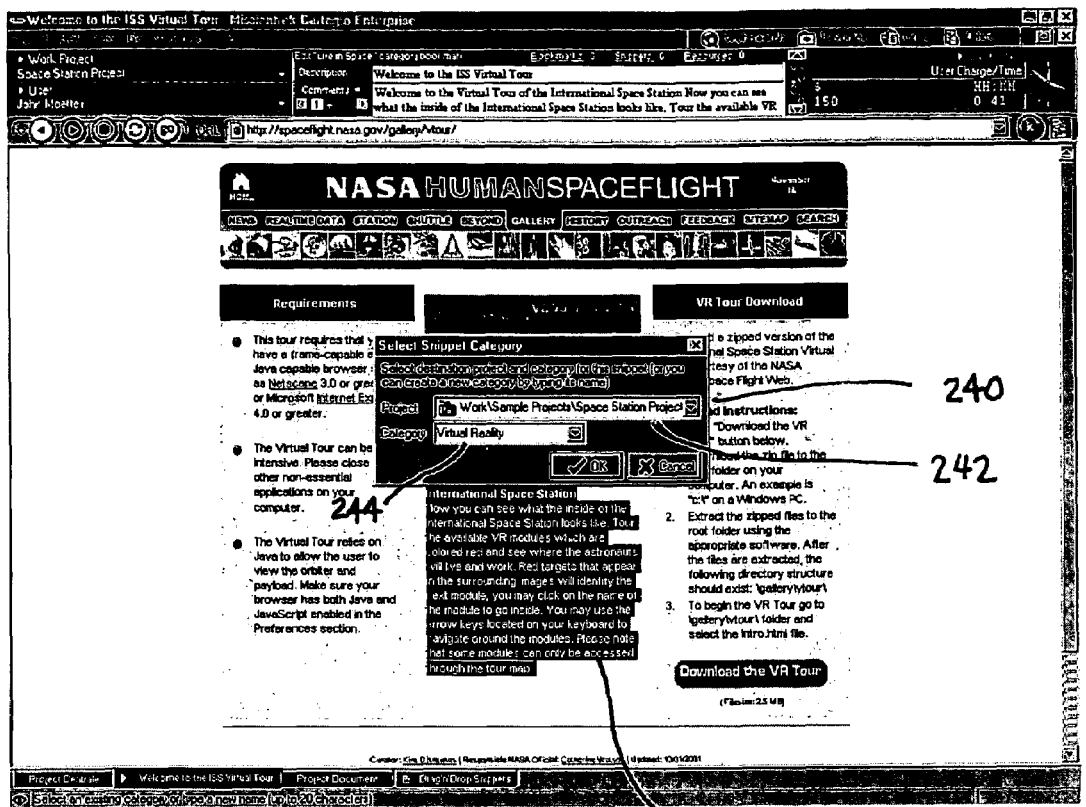
Figure 14:
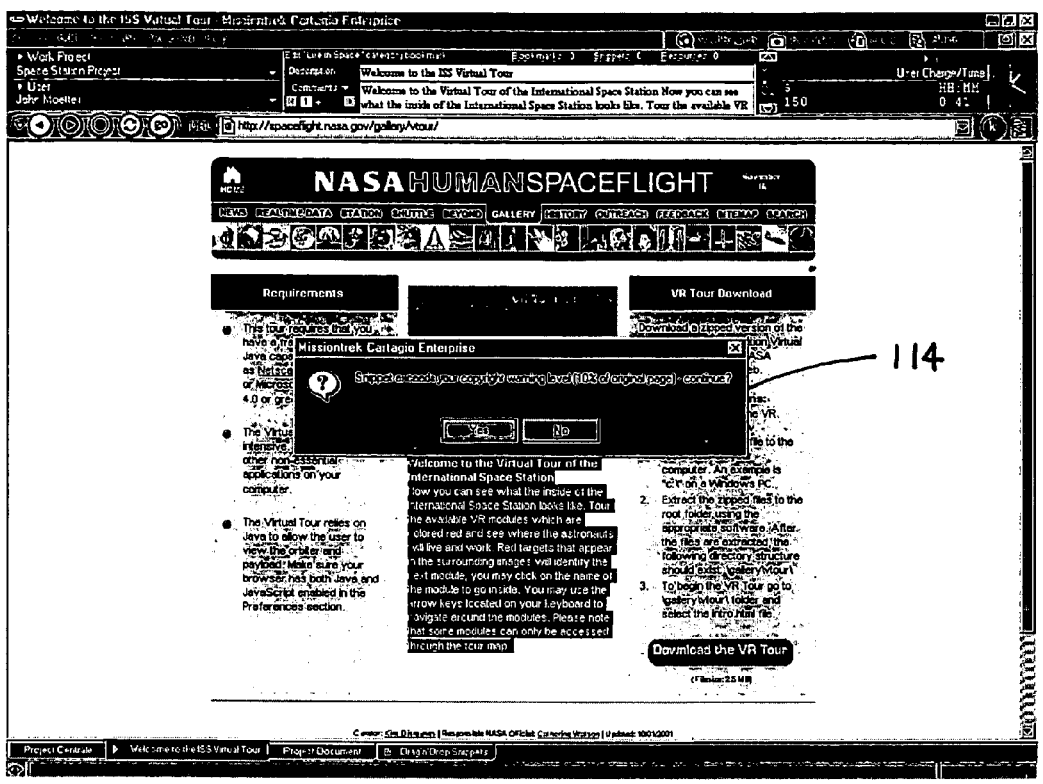

Referring now to FIG. 13, when "New category" menu item 234 is selected, a select category popup 240 is shown, having a Project field 242 and a Category field 244 through which the snippet selection 116 can be saved to a new category in the same project or another project and in another existing or new category, selected in a similar manner. If the amount copied exceeds the copyright warning level, then, as shown in FIG. 14, the copyright warning message 114 is displayed. If the user clicks "OK", the method advances.

Figure 15:
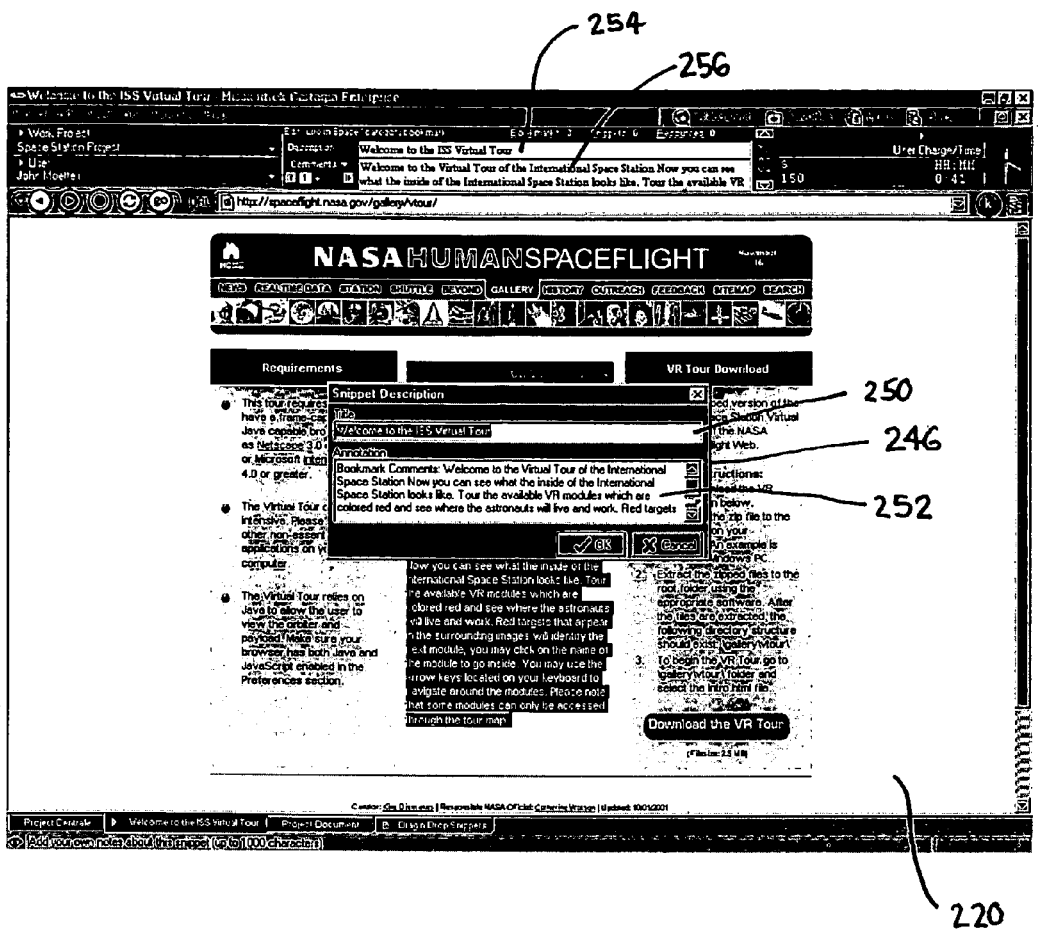
Figure 16:
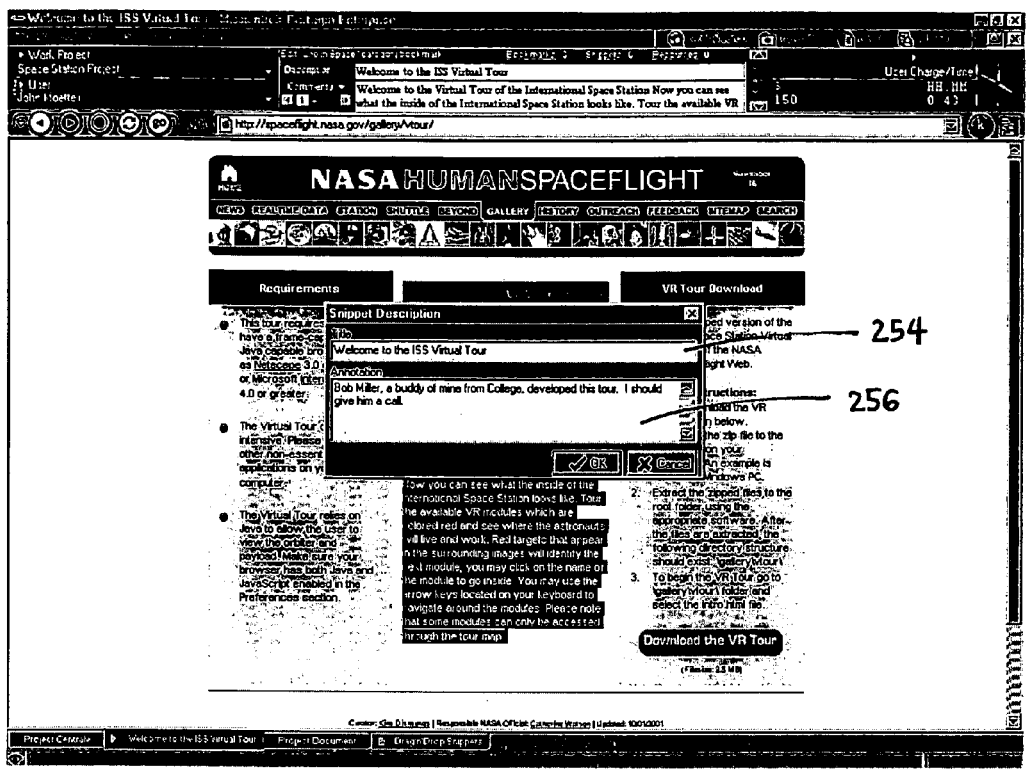

Referring now to FIG. 15, a snippet description input window 246 is displayed (provided that if the user received a copyright warning, he overrode it) shown having a title field 250 and an annotation field 252. If the web page 220 from which the snippet selection 116 was taken had a bookmark title 254 or comment 256 associated with it, the method copies the bookmark title and comment into the title field 250 and annotation field 252 as a default. Referring now to FIG. 16, the user may nevertheless edit or delete this bookmark title 254 or comment 256.

Figure 17:
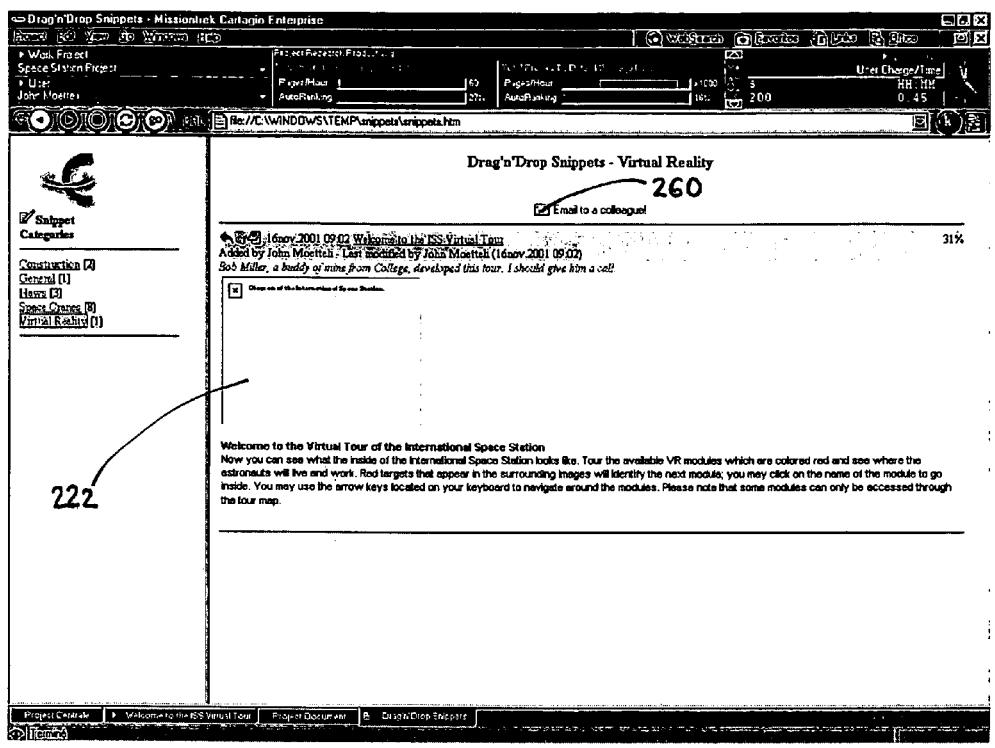

Referring now to FIG. 17, the resulting snippet 30 is shown, in off-line mode, in which the graphic 222 cannot be downloaded. However, once the user is online, he is able to access any graphics 222 stored in the snippet 30, provided they are still accessible on the Internet.

Figure 18:
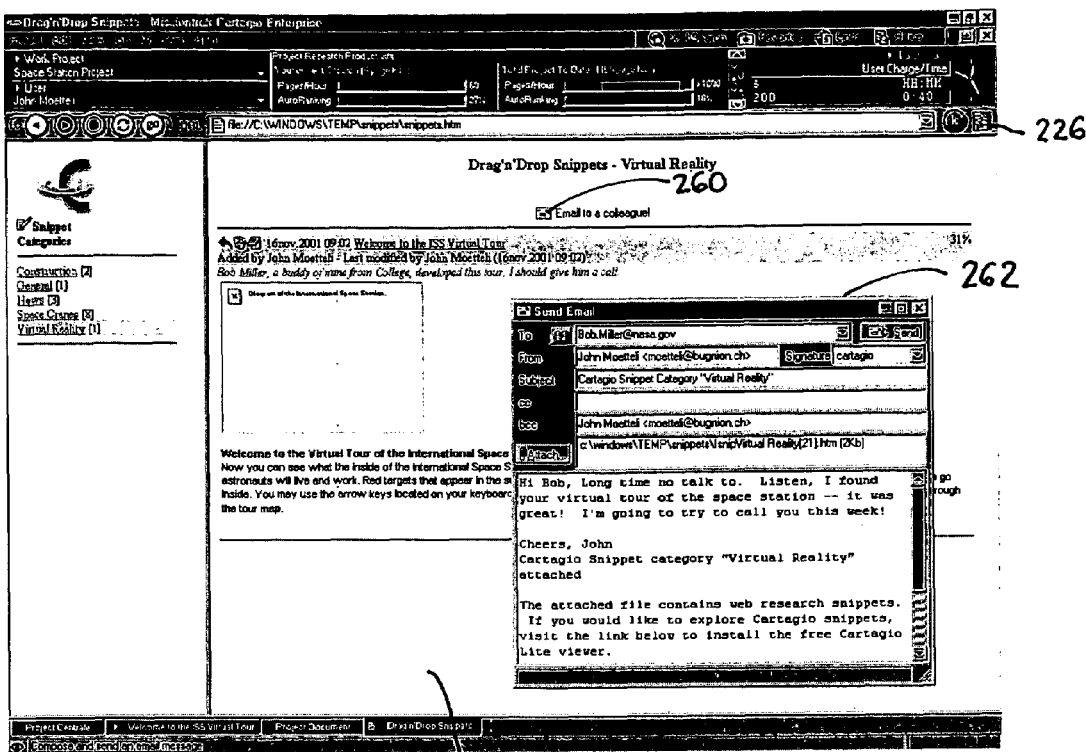

Referring now to FIG. 18, the user may optionally click the "email to a colleague" hyperlink icon 260 at the top, center of the snippet display frame 16. If he does, an email window 262 opens, automatically attaching the contents of the snippets frame 16.

The contents of the snippets frame 16 is in html format and therefore, after receipt by the recipient, it may be opened and viewed using a conventional web browser. When used together with project-based browsing software as described in PCT/US0017409, "Browsing Method for Focusing Research", the content being incorporated herein by reference, the method allows multiple users to access the same set of snippet files for collaboration or data dissemination purposes. The system optionally provides a means of specifying the location of these snippet files, such as by specifying a Snippets folder on the Snippet Options dialog (Specify Snippets Foder [edit field] [Browse Btn]). Thus users can create and share multiple snippets folders. Alternatively, sharing of Snippets may be limited to such times as when a given project is open, by simply giving the user with whom the snippet is to be shared the URL in the Snippets browser tab (e.g. C:\Windows\Temp\Snippets\snippets.htm)

Figure 19:
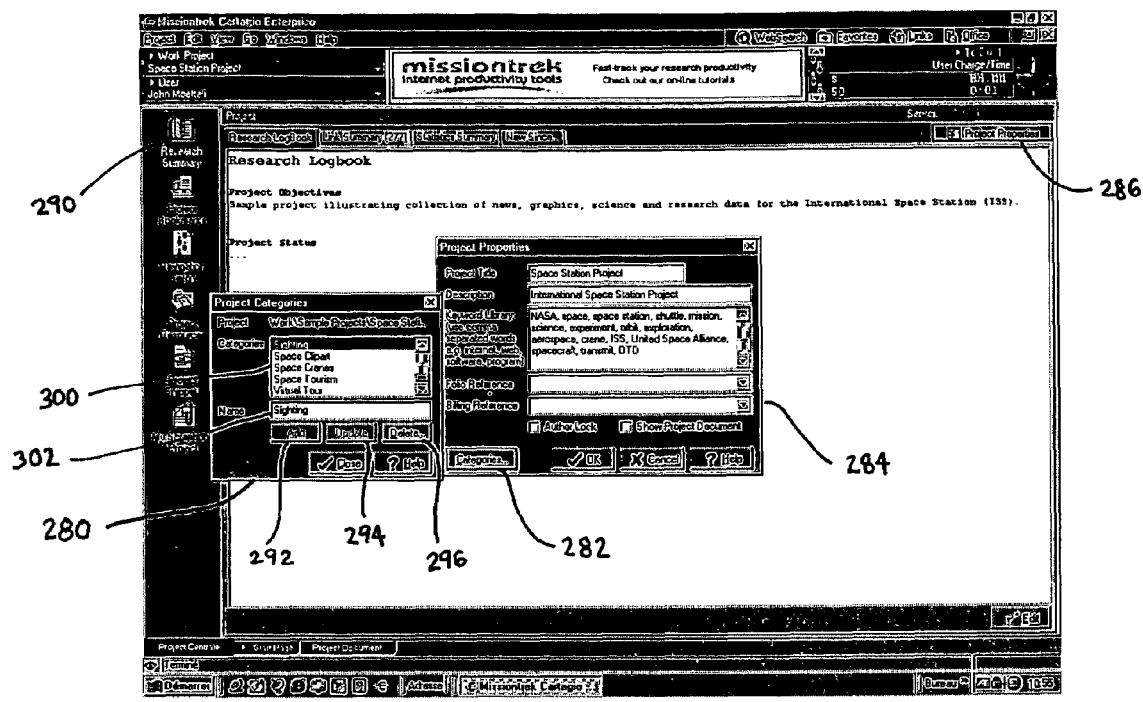
FIG. 19 is a screen print showing the edit category feature of the invention.

Now referring to FIG. 19, a category manager interface 280 provides the user a means to add, rename and delete categories. The interface 280 is opened by pressing a categories button 282 on a project properties window 284. The project properties window 284 is opened by clicking a project properties icon 286 under the Research summary library 290. Note that an add button 292, a update button 294 and a delete button 296 are provided to manage categories listed in a category listing 300. A category naming field 302 is provided to add new or modify highlighted category names in the category listing 300.

The presentation of the comment window described above may be turned on or off according to the snippets option popup 100 selections.

The method processes the content dragged to it as outlined below, including that originating from external sources such as emails and documents:

(i) All relative URLs are converted to absolute URLs by combining them with a base URL. This base URL may be found in a BASE tag, if no BASE tag then the URL or source of the original document is used.

(ii) Embedded content such as images (and/or associated URLs) may optionally be stripped from the content. Exclusion of such content reduces storage requirements and/or download times. Where content URLs are included, they are converted to absolute source URLs.

(iii) The percentage of copied text is calculated. This is based on standard text excluding markup tags and other HTML content, and provides a mechanism to determine the extent of copying to provide feedback to the user regarding possible copyright law infringement.

(iv) The selected text may contain starting tags but may not include associated ending tags. While this does not directly affect the display of the HTML by itself, it may cause problems with the snippet system or the viewing system. Therefore, ending tags are added to the end of each snippet to encapsulate them independently when combined under the user specified category.

In an optional additional processing step, if the snippets percentage being copied exceeds a user definable value the user is asked to confirm the addition of the snippet.

In another optional processing step, the destination snippet category storage size is checked against a user definable maximum size value. If exceeded, the user is advised and prompted to confirm the addition. This provides the user a measure of control over subsequent file storage requirements and access times.

Optionally, if source of the snippet is detected to be not from the host browser, then a user interface allows the user to edit the snippets title and add an annotation.

The snippet is added to the end of the selected category, enclosed within its identifying tags—thus separating it from the formatting characteristics of previous snippets. The following details are also added: (1) Date and time the snippet was added; (2) Percentage copied from original document if known; and (3) the original documents URL and title if available. For text from the host browser the name source and title will be available, but for external applications this may not be, depending on the operating system and the source application.

The contents of the snippet system may be viewed at any time within a "browser window" of the host browser. This comprises a category area and the main viewing area. The category area displays a list of categories from which the user may choose a category to view and a means of accessing the category manager user interface. The main viewing area is where the contents of the selected category are displayed.

If a snippet selection 116 is taken from a program other than a browser, the user is provided an input window (not shown but identical in appearance to input window 246) to enter a title and annotations.

The user may continue with their information search. They may also highlight and pass selections 116 to a Snippets menu item as an alternative to the drag and drop facility above.

At any time, a user may click on the Snippet icon 226 to view the repository of snippets 30. The displayed interface lists all categories and allows the user to view any category. The interface also allows the user to manage their categories; adding, deleting or renaming categories; moving, copying or deleting of snippets; and adding comment to snippets.

Since the snippets of information contained in various categories can grow to represent an invaluable resource for others, other network users can be given instant access to snippets resources by providing a URL. This enables them to traverse the snippets repository using a standard browser (i.e. without requiring specialized software). Users can also choose to email their snippets resources to others using standard email facilities. Optionally, search facilities can be used to locate snippets resources containing sought key words in any field, whether the title field 250, the annotation field 254 or the snippet selection 116.

Snippet Storage

The Snippet categories and additional pages used for display of the Snippet system are stored as HTML files. These files follow the HTML standard except for certain custom HTML tags. The custom tags are used for providing control elements for editing options (e.g. edit categories, edit/move/annotate snippet etc.). The fact that standard HTML browsers ignore unrecognized tags means these control elements remain invisible and therefore do not interfere with other users accessing the information via standard browsers.

Internal HTML Extraction

When the selected HTML is added to the snippets, the method of extraction is browser specific. When processing the HTML, embedded content, such as images, can be optionally retained or removed as required by the user. Also URL anchors and relative URLs are resolved to absolute URLs, to enable snippets to provide URL access to that content linked to in the original document.

Since portions of original source HTML to be included in a Snippets category may not include matching opening and closing tags, processing is included in which opening tags are added where an unmatched closing tag is found and vice versa, to ensure each snippet preserves its original display attributes where possible. To terminate the HTML, it is checked for tables and other relevant tags that have not been terminated. When these situations are detected, the appropriate matching tags are added. Also ending tags are added to terminate formatting that is not automatically terminated by the ending of table cells.

External Snippets

In addition to Internet and Intranet information sources, the system also supports including snippet selections 116 from other textual and HTML based documents. Where required, these are processed to protect the format of the snippet category pages. In cases where the snippet source content is transferred from another browser, wherever possible the raw HTML is copied, otherwise the plain text is copied.

Calculation of Original Document Percentage

This percent value is calculated on the unmarked up text, not the raw HTML. The percent copied value is presented to the user to allow an assessment regarding copyright considerations for personal use as described above.

Multi-User Support

The Snippets system uses a number of files generated by the software to display the contents. The system allows these files to be located anywhere on a computer network. Although the system has a default location for these files on the current user's computer, it allows the location to be changed (i) for central storage and access by multiple users in a workgroup environment and (ii) to enable users to create multiple resources of snippets according to their information classification requirements.

This network ability allows multiple users to set the location on multiple computers to the same location so to share the resource. Also because the system is based on standard HTML files, the snippet resources can be viewed by others utilizing standard HTML display features and using standard browsers. However the editing options are not provided when accessed by other browsers not equipped with the snippets processing software.

Typical Example of Use

The following is an example of general usage of the Snippets system.

John Doe begins a search for information on battles in the American Civil War using a web based search engine. The search engine provides a large number of pages with links to possible relevant pages. He proceeds to visit each link to determine the relevancy of the pages pointed to by the link.

When he finds the first page containing any information of relevance, he selects the relevant text portion and drags it to the Snippet icon. He elects to create a new category and names it "Civil War".

He proceeds with his search, occasionally dragging text to the Snippet icon and selecting to add it to his "Civil War" category.

Occasionally he comes across information of relevance to other subjects in which he has an interest. When transferring this information to his snippets resources, he can choose to add the new material into categories he has created previously, or create specific new categories or to save the snippet into another project.

He can also choose to share his snippets resources with others—either via an existing computer network connection or by emailing snippet categories in HTML format. He can also assign research tasks to co-workers, whereby they can concurrently add their own material to the snippets resources if using a browser equipped with the snippets system.

At any time later, he and his co-workers can review the contents of the snippets categories. They can choose to reclassify into new categories as required e.g. "Civil War Battles" and "Civil War Politics" etc., annotate or delete superfluous content, and revisit the original sites to review content changes.

In an advantage of the invention, snippets of information found on the Internet can be saved, categorized and stored according to the desire of the user.

In another advantage, the system eliminates the need to print out interesting web content by providing a reliable electronic storage locale.

In another advantage, snippets may be instantly shared with colleagues, clients and co-workers via email or via storage in a project file to which these collaborators have access.

In another advantage, the snippet selection 116 is stored in an unalterable form in order to provide proof of the existence of content on the Internet, important should the user attempt to use the snippet 30 to support a libel or unfair competition claim based on, for example, the tortuous nature of the content published on the web by another.

Multiple variations and modifications are possible in the embodiments of the invention described here. Although certain illustrative embodiments of the invention has been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A web snippets capture, storage, and retrieval system managing and displaying user-selected snippets of downloaded, displayed web content, the system including software operating on a computer, the software having snippet selection means which enables a user to select a web snippet of web content comprised of text, snippet processing means which processes the snippet so selected, snippet organization means enabling the user to select a project, folder, category or theme with which the snippet is to be associated, and snippet storage means which stores the processed snippet in memory in association with the particular user-selected project, folder, category or theme, in a format which can be readily displayed by a user wherein the processing means includes the substeps of:

(i) converting relative Uniform Resource Locators in the snippet to absolute Uniform Resource Locators by combining them with a base Uniform Resource Locator, and (ii) independently encapsulating the snippet.

2. The system of claim 1 wherein a user prompting means prompts the user for a comment and if a comment is provided by the user, the storage means stores the comment in displayable form in association with the snippet.

3. The system of claim 1 wherein identifying means are provided for storing identifying characteristics of the snippet.

4. The system of claim 3, wherein the identifying characteristics of the snippet include one of a characteristic selected from a group of characteristics consisting of data of creation, time of creation, size of snippet in relation to source document, source location of snippet, Uniform Resource Locator of the snippet and the user who added the snippet.

5. The system of claim 4 wherein display means displays the snippet with at least one identifying characteristic.

6. The system of claim 1, wherein, where the snippet includes content Uniform Resource Locators identifying embedded content such as images, the processing step further includes the substep of converting content Uniform Resource Locators to absolute source Uniform Resource Locators.

7. A web snippets capture, storage, and retrieval software method operable on a computer, the method operating on a snippet of downloaded, displayed web content comprised of text, the method including the steps of, using user-selectable means, selecting a snippet to be stored, processing the snippet to be stored, selecting a project, folder, category or theme with which the snippet is to be associated and storing the processed snippet in association with the particular user-selected project, folder, category or theme, in a format that can be readily displayed by a user, wherein the processing includes the substeps of:

(i) converting relative Uniform Resource Locators in the snippet to absolute Uniform Resource Locators by combining them with a base Uniform Resource Locator, and (ii) independently encapsulating the snippet.

8. The method of claim 7 wherein between the capturing and storing steps, the method prompts the user for a comment and if a comment is input, the method stores the comment in displayable form in association with the snippet.

9. The method of claim 7 wherein identifying characteristics of the snippet are stored in association with the snippet.

10. The method of claim 9, wherein the identifying characteristics of the snippet include one of a characteristic selected from a group of characteristics consisting of date and time of creation, size of snippet in relation to source document, source location of snippet, Uniform Resource Locator of snippet and the name of the user adding the snippet.

11. The method of claim 10 wherein display means displays the snippet with at least one identifying characteristic.

12. The method of claim 7, wherein, where the snippet includes content Uniform Resource Locators identifying embedded content such as images, the processing further includes the substep of converting content Uniform Resource Locators to absolute source Uniform Resource Locators.

13. A web snippets capture, storage, and retrieval software method operable on a computer, the method including the steps of:

a. using a selection protocol enabling a user to select a snippet of downloaded, displayed web content comprised of text;

b. when a selection is made, processing the snippet by performing the following substeps of:

(i) converting relative Uniform Resource Locators in the snippet to absolute Uniform Resource Locators by combining them with a base Uniform Resource Locator, and (ii) independently encapsulating the snippet.

c. where the system so permits, enabling the user to drag the selection to a specialized icon, and where the system does not so permit, providing a right-click menu option for the same;

d. when the dragged selection is dragged to the specialized icon, recognizing the snippet and processing the snippet;

e. responsive to a user-input project, folder, category or theme to which the snippet is to be stored, storing the snippet in association with the particular user-selected project, folder, category or theme, and f. recalling the stored snippet for display at the will of the user.

14. The method of claim 13 wherein processing step (c) includes the substep of stripping embedded image files and associated Uniform Resource Locators from the content of the snippet.

15. The method of claim 13, wherein the processing step (c) includes determining the extent of copying.

16. The web snippets capture, storage, and retrieval software method of claim 13, wherein, step (d) of the method includes the following steps:

(i) opening a category menu allowing the user to select from a group of options consisting of selecting an existing category for the snippet and creating a new category;

(ii) if the user selects to create a new category, displaying a user interface element to allow the user to enter a name for the new category and verifying that the name is unique before creating the category;

(iii) providing means for the user to edit categories;

(iv) presenting a comment input window into which the user may make comments specifically associated with the snippet; and (v) storing the comment and any other routine identifying information in association with the snippet in an electronically displayable format.

17. The web snippets capture, storage, and retrieval software method of claim 13, wherein, the method further includes the step of providing email capabilities whereby the snippet is automatically attached to the associated email for distribution.

18. The method of claim 13, wherein the tagged selection is highlighted.

19. The method of claim 13, wherein, where the snippet includes content Uniform Resource Locators identifying embedded content such as images, the processing of the snippet further includes the substep of converting content Uniform Resource Locators to absolute source Uniform Resource Locators.

* * * * *

UNITED STATES PATENT AND TRADEMARK OFFICE
CERTIFICATE OF CORRECTION

PATENT NO.         : 7,315,848 B2                                    Page 1 of 1
APPLICATION NO.    : 10/450213
DATED              : January 1, 2008
INVENTOR(S)        : Pearse et al.

It is certified that error appears in the above-identified patent and that said Letters Patent is hereby corrected as shown below:

In Col. 1, line 19, replace the phrase "6,067,565 to Horyitz" with --6,067,565 to Horvitz--.

In Col. 1, line 35, replace the phrase "what is need is a" with --what is needed is a--.

In Col. 1, line 55, replace the phrase "tics includes, for example" with --tics include, for example--.

In Col. 3, line 50, replace the phrase "content that is has been highlighted" with --content that is/has been highlighted--.

In Col. 4, line 43, replace the phrase "user than drags" with --user then drags--.

In Col. 4, line 65, replace the phrase "he overrode it) shown" with --he overrode it), shown--.

In Col. 5, line 38, replace the phrase ", a update button" with --, an update button--.

In Col. 8, line 42, replace the phrase "invention has been" with --invention have been--.

In Col. 9, line 15, replace the phrase "of data of" with --of date of--.

Signed and Sealed this

Twenty-eighth Day of April, 2009

JOHN DOLL
*Acting Director of the United States Patent and Trademark Office*